(12) United States Patent
Yamagaki

(10) Patent No.: US 9,825,462 B2
(45) Date of Patent: Nov. 21, 2017

(54) POWER NETWORK SYSTEM, CONTROL METHOD FOR POWER NETWORK SYSTEM, AND CONTROL PROGRAM FOR POWER NETWORK SYSTEM

(71) Applicant: NEC Corporation, Minato-ku, Tokyo (JP)

(72) Inventor: Norio Yamagaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 383 days.

(21) Appl. No.: 14/412,769

(22) PCT Filed: Jul. 5, 2013

(86) PCT No.: PCT/JP2013/068504
§ 371 (c)(1),
(2) Date: Jan. 5, 2015

(87) PCT Pub. No.: WO2014/007368
PCT Pub. Date: Jan. 9, 2014

(65) Prior Publication Data
US 2015/0155710 A1    Jun. 4, 2015

(30) Foreign Application Priority Data
Jul. 6, 2012 (JP) ................................. 2012-152955

(51) Int. Cl.
*H02J 13/00* (2006.01)
*H02J 3/00* (2006.01)
(Continued)

(52) U.S. Cl.
CPC .................. *H02J 3/00* (2013.01); *H02J 3/04* (2013.01); *H02J 3/28* (2013.01); *H02J 3/38* (2013.01);
(Continued)

(58) Field of Classification Search
USPC .............................................. 307/18; 361/62
See application file for complete search history.

(56) References Cited

FOREIGN PATENT DOCUMENTS

JP    2006-304403 A    11/2006
JP    2011-061970 A    3/2007
(Continued)

OTHER PUBLICATIONS

International Search Report for PCT Application No. PCT/JP2013/068504 dated Jul. 30, 2013.

*Primary Examiner* — Rexford Barnie
*Assistant Examiner* — Xuan Ly

(57) ABSTRACT

When some failure occurs in the case where power interchange is performed among grids, an alternate route is searched at high speed in consideration of a deficiency/excess amount of power. A power network system has a plurality of power routers (1-7), power transmission lines (100-111) connecting the power routers, a controller (8), a communication network (10), and communication lines (11). The controller (8) obtains a reception electric energy and a transmission electric energy in the power routers (1-7), detects a failure due to a fault in, for example, the power router (4), and searches for an alternate route to solve deficiency/excess power caused by the failure occurrence. Concretely, an alternate route is searched while following a power router having excessive power as a root node by a breadth first search, and transmitting the deficiency/excess power and an allowable power transmission capacity in each of the power routers to an adjacent power router. A control instruction related to interchange power is output via the alternate route.

6 Claims, 25 Drawing Sheets

(51) Int. Cl.
*H02J 3/38* (2006.01)
*H02J 3/04* (2006.01)
*H02J 3/28* (2006.01)

(52) U.S. Cl.
CPC ........ *H02J 13/002* (2013.01); *H02J 13/0086* (2013.01); *H02J 2003/001* (2013.01); *Y02E 40/72* (2013.01); *Y02E 60/722* (2013.01); *Y04S 10/12* (2013.01); *Y04S 10/14* (2013.01); *Y04S 10/525* (2013.01); *Y10T 307/305* (2015.04)

(56) References Cited

FOREIGN PATENT DOCUMENTS

| | | | |
|---|---|---|---|
| JP | 2009-225534 | A | 10/2009 |
| JP | 2010-207056 | * | 9/2010 |
| JP | 2010-207056 | A | 9/2010 |
| JP | 2011-061970 | * | 3/2011 |

* cited by examiner

Fig.4

30: CONNECTION INFORMATION MANAGEMENT TABLE

|  | \multicolumn{4}{c}{CONNECTION DESTINATION NODE} |
|---|---|---|---|---|
|  | 1 | 2 | ... | N |
| 1 | 0 | 1 | ... | 0 |
| 2 | 1 | 0 | ... | 1 |
| ... | ... | ... | ... | ... |
| N | 0 | 1 | ... | 0 |

CONNECTION SOURCE NODE (row labels)

Fig.5

40: ALLOWABLE POWER TRANSMISSION CAPACITY MANAGEMENT TABLE

|  | \multicolumn{4}{c}{CONNECTION DESTINATION NODE} |
|---|---|---|---|---|
|  | 1 | 2 | ... | N |
| 1 | 0 | 200 | ... | 0 |
| 2 | 200 | 0 | ... | 100 |
| ... | ... | ... | ... | ... |
| N | 0 | 300 | ... | 0 |

CONNECTION SOURCE NODE (row labels)

Fig.8

60: NODE INFORMATION

| VISIT ORDER LIST | INTERCHANGE POWER | DEFICIENCY/EXCESS POWER |
|---|---|---|
| [5, 2] | 50 | 0 |

Fig.10

31: CONNECTION INFORMATION MANAGEMENT TABLE

CONNECTION SOURCE NODE / CONNECTION DESTINATION NODE

| | 1 | 2 | 3 | 4 | 5 | 6 | 7 |
|---|---|---|---|---|---|---|---|
| 1 | 0 | 1 | 1 | 0 | 0 | 0 | 0 |
| 2 | 1 | 0 | 1 | 1 | 1 | 0 | 0 |
| 3 | 1 | 1 | 0 | 1 | 0 | 1 | 0 |
| 4 | 0 | 1 | 1 | 0 | 1 | 1 | 0 |
| 5 | 0 | 1 | 0 | 1 | 0 | 1 | 1 |
| 6 | 0 | 0 | 1 | 1 | 1 | 0 | 1 |
| 7 | 0 | 0 | 0 | 0 | 1 | 1 | 0 |

Fig.11

41: ALLOWABLE POWER TRANSMISSION CAPACITY MANAGEMENT TABLE

CONNECTION SOURCE NODE / CONNECTION DESTINATION NODE

| | 1 | 2 | 3 | 4 | 5 | 6 | 7 |
|---|---|---|---|---|---|---|---|
| 1 | 0 | 250 | 200 | 0 | 0 | 0 | 0 |
| 2 | 150 | 0 | 200 | 300 | 350 | 0 | 0 |
| 3 | 200 | 200 | 0 | 300 | 0 | 200 | 0 |
| 4 | 0 | 100 | 100 | 0 | 350 | 250 | 0 |
| 5 | 0 | 50 | 0 | 50 | 0 | 300 | 200 |
| 6 | 0 | 0 | 200 | 150 | 100 | 0 | 200 |
| 7 | 0 | 0 | 0 | 0 | 200 | 200 | 0 |

Fig.13

32: CONNECTION INFORMATION MANAGEMENT TABLE

CONNECTION SOURCE NODE / CONNECTION DESTINATION NODE

| | 1 | 2 | 3 | 4 | 5 | 6 | 7 |
|---|---|---|---|---|---|---|---|
| 1 | 0 | 1 | 1 | 0 | 0 | 0 | 0 |
| 2 | 1 | 0 | 1 | 0 | 1 | 0 | 0 |
| 3 | 1 | 1 | 0 | 0 | 0 | 1 | 0 |
| 4 | 0 | 0 | 0 | 0 | 0 | 0 | 0 |
| 5 | 0 | 1 | 0 | 0 | 0 | 1 | 1 |
| 6 | 0 | 0 | 1 | 0 | 1 | 0 | 1 |
| 7 | 0 | 0 | 0 | 0 | 1 | 1 | 0 |

Fig.14

42: ALLOWABLE POWER TRANSMISSION CAPACITY MANAGEMENT TABLE

CONNECTION SOURCE NODE / CONNECTION DESTINATION NODE

| | 1 | 2 | 3 | 4 | 5 | 6 | 7 |
|---|---|---|---|---|---|---|---|
| 1 | 0 | 250 | 200 | 0 | 0 | 0 | 0 |
| 2 | 150 | 0 | 200 | 0 | 350 | 0 | 0 |
| 3 | 200 | 200 | 0 | 0 | 0 | 200 | 0 |
| 4 | 0 | 0 | 0 | 0 | 0 | 0 | 0 |
| 5 | 0 | 50 | 0 | 0 | 0 | 300 | 200 |
| 6 | 0 | 0 | 200 | 0 | 100 | 0 | 200 |
| 7 | 0 | 0 | 0 | 0 | 200 | 200 | 0 |

52: DEFICIENCY/EXCESS POWER MANAGEMENT TABLE

| | DEFICIENCY/EXCESS POWER |
|---|---|
| 1 | 0 |
| 2 | -100 |
| 3 | -100 |
| 4 | 0 |
| 5 | 150 |
| 6 | 50 |
| 7 | 0 |

Fig.17

43: ALLOWABLE POWER TRANSMISSION
CAPACITY MANAGEMENT TABLE

|  | \ | CONNECTION DESTINATION NODE | | | | | | |
|---|---|---|---|---|---|---|---|---|
|  |  | 1 | 2 | 3 | 4 | 5 | 6 | 7 |
| CONNECTION SOURCE NODE | 1 | 0 | 250 | 200 | 0 | 0 | 0 | 0 |
|  | 2 | 150 | 0 | 200 | 0 | 400 | 0 | 0 |
|  | 3 | 200 | 200 | 0 | 0 | 0 | 200 | 0 |
|  | 4 | 0 | 0 | 0 | 0 | 0 | 0 | 0 |
|  | 5 | 0 | 0 | 0 | 0 | 0 | 300 | 200 |
|  | 6 | 0 | 0 | 200 | 0 | 100 | 0 | 200 |
|  | 7 | 0 | 0 | 0 | 0 | 200 | 200 | 0 |

Fig.19

62: NODE INFORMATION

PROCESS NODE = NODE 5 (ROOT NODE)

| VISIT ORDER LIST | INTERCHANGE POWER | DEFICIENCY/ EXCESS POWER |
|---|---|---|
| [5] | 100 | 100 |

NODE 7

| VISIT ORDER LIST | INTERCHANGE POWER | DEFICIENCY/ EXCESS POWER |
|---|---|---|
| [5, 7] | 100 | 100 |

NODE 6

| VISIT ORDER LIST | INTERCHANGE POWER | DEFICIENCY/ EXCESS POWER |
|---|---|---|
| [5, 6] | 100 | 150 |

FIFO

SEARCH NODE

Fig.21

44: ALLOWABLE POWER TRANSMISSION
CAPACITY MANAGEMENT TABLE

CONNECTION SOURCE NODE / CONNECTION DESTINATION NODE

| | 1 | 2 | 3 | 4 | 5 | 6 | 7 |
|---|---|---|---|---|---|---|---|
| 1 | 0 | 250 | 200 | 0 | 0 | 0 | 0 |
| 2 | 150 | 0 | 200 | 0 | 400 | 0 | 0 |
| 3 | 200 | 200 | 0 | 0 | 0 | 300 | 0 |
| 4 | 0 | 0 | 0 | 0 | 0 | 0 | 0 |
| 5 | 0 | 0 | 0 | 0 | 0 | 200 | 200 |
| 6 | 0 | 0 | 100 | 0 | 200 | 0 | 200 |
| 7 | 0 | 0 | 0 | 0 | 200 | 200 | 0 |

Fig.24

65: NODE INFORMATION

PROCESS NODE = NODE 3

| VISIT ORDER LIST | INTERCHANGE POWER | DEFICIENCY/ EXCESS POWER |
|---|---|---|
| [6, 3] | 50 | 50 |

SEARCH NODE

NODE 1

| VISIT ORDER LIST | INTERCHANGE POWER | DEFICIENCY/ EXCESS POWER |
|---|---|---|
| [6, 3, 1] | 50 | 50 |

NODE 7

| VISIT ORDER LIST | INTERCHANGE POWER | DEFICIENCY/ EXCESS POWER |
|---|---|---|
| [6, 7] | 50 | 50 |

NODE 5

| VISIT ORDER LIST | INTERCHANGE POWER | DEFICIENCY/ EXCESS POWER |
|---|---|---|
| [6, 5] | 50 | 50 |

FIFO →

66: NODE INFORMATION

PROCESS NODE = NODE 3

| VISIT ORDER LIST | INTERCHANGE POWER | DEFICIENCY/ EXCESS POWER |
|---|---|---|
| [6, 3] | 50 | 50 |

SEARCH NODE = NODE 2

| VISIT ORDER LIST | INTERCHANGE POWER | DEFICIENCY/ EXCESS POWER |
|---|---|---|
| [6, 3, 2] | 50 | 0 |

NODE 6 → NODE 3: 50 kW
NODE 3 → NODE 2: 50 kW

Fig.26

45: ALLOWABLE POWER TRANSMISSION CAPACITY MANAGEMENT TABLE

CONNECTION SOURCE NODE / CONNECTION DESTINATION NODE

| | 1 | 2 | 3 | 4 | 5 | 6 | 7 |
|---|---|---|---|---|---|---|---|
| 1 | 0 | 250 | 200 | 0 | 0 | 0 | 0 |
| 2 | 150 | 0 | 250 | 0 | 400 | 0 | 0 |
| 3 | 200 | 150 | 0 | 0 | 0 | 350 | 0 |
| 4 | 0 | 0 | 0 | 0 | 0 | 0 | 0 |
| 5 | 0 | 0 | 0 | 0 | 0 | 200 | 200 |
| 6 | 0 | 0 | 50 | 0 | 200 | 0 | 200 |
| 7 | 0 | 0 | 0 | 0 | 200 | 200 | 0 |

POWER NETWORK SYSTEM, CONTROL METHOD FOR POWER NETWORK SYSTEM, AND CONTROL PROGRAM FOR POWER NETWORK SYSTEM

This application is a National Stage Entry of PCT/JP2013/068504 filed on Jul. 5, 2013, which claims priority from Japanese Patent Application 2012-152955 filed on Jul. 6, 2012, the contents of all of which are incorporated herein by reference, in their entirety.

TECHNICAL FIELD

The present invention relates to a power network system, a control method for a power network system, and a control program for a power network system.

BACKGROUND ART

In recent years, introduction of renewable energy represented by wind power generation, photovoltaic power generation, and the like is making rapid progress. However, when a large amount of power generated by the renewable energy flows as reverse power flow into a power system, the voltage and frequency of the power system fluctuate, and the quality maintenance of the power is difficult. Consequently, in power systems at present, the acceptable renewable energy is often limited to suppress deterioration in the quality of power. That is, the power systems at present have a problem such that a large amount of renewable energy cannot be introduced.

To solve the problem and introduce a large amount of renewable energy, a novel power network in which autonomously-controlled power systems are disposed so as to be dispersed is being examined. One of such power networks is a smart grid. In power systems disposed so as to be dispersed, that is, in a grid, by absorbing fluctuations of the amount of power generation by the renewable energy by using a power storage device in the grid or a demand-supply balance adjusting function, reverse power flow to an existing power system can be largely reduced.

Further, a technique of enabling power to be interchanged among grids is proposed. According to the technique disclosed in Patent Literature 1, a plurality of multi-terminal asynchronous interconnected devices having a plurality of self-excited power converters for bidirectionally converting power are disposed and mutually connected, thereby constructing a power network. The power network system is controlled so that the sum of inflow power and outflow power in a power router will be zero, and interchanges powers asynchronously among the grids. With the configuration, power can be supplied from another grid at the time of power shortage, and robustness of the grids improves. Since the power can be interchanged among the grids, it is possible to perform power trades.

CITATION LIST

Patent Literature

[PTL 1] Patent Literature 1: Japanese Patent Publication No. 4,783,453

SUMMARY OF INVENTION

Technical Problem

In Patent Literature 1, it is described that a power network system according to the conventional technique is similar to the Internet. It is also described that when some failure such as disconnection of a power transmission line or a failure in a power router occurs in the case where power interchange is performed among grids, an alternate route can be found. However, means for searching for an alternate route is not described.

The Internet is formed by mutually connecting server computers of autonomously distributed networks, and a computer for controlling the entire Internet does not exist. Services on the Internet are provided among server computers. Also in the power network system according to the conventional technique similar to the Internet, a computer for controlling the whole does not exist. A control similar to that in the Internet is performed among power routers. For example, in the case where power shortage is predicted in a certain power grid, the power router of the power grid sends a power interchange request including transaction conditions simultaneously to a plurality of power routers of other power grids. A power router of a power grid which can interchange power sends a reply. Next, the power router of the request source transmits a reservation transaction condition to the power router of the response destination, and the power router of the response destination sends a reservation settlement condition back to the power router of the request source. In such a manner, control related to the power transaction is performed among power routers.

Although such a control of the autonomous distribution type enables reservation of a power transaction and the like, there is a possibility that it is not carried out in case of an emergency such as failure occurrence.

On the other hand, in the history of the Internet, at the initial stage, a network was formed by mutually connecting server computers of research organizations such as universities. After that, a service provider for partially managing information communication appeared.

The present invention is achieved to solve the problem and an object of the invention is to provide, also in a power network system, means for searching for an alternate route at high speed in consideration of a deficiency/excess amount of power when some failure occurs in the case where power interchange is performed among grids while executing partial management by an administrator of a service provider or the power network system.

Solution to Problem

The present invention which solves the problem relates to a power network system formed by connecting a plurality of grids each including a power generating apparatus, a power accumulating apparatus, a load apparatus, a power network, and a power router and dispersed so that they can be autonomous, via the power routers and power transmission lines, controlled so that sum of inflow power and outflow power in the power router will be zero, and asynchronously interchanging power among the grids, characterized in that the power network system further includes a controller connected to each of the power routers via a communication network, and the controller includes: an electric energy obtaining unit which obtains a reception electric energy and a transmission electric energy in each of the power routers; a failure determining unit which determines a failure in a power router or a power transmission line on the basis of the obtained electric energies; an alternate route searching unit which searches for an alternate route so as to solve deficient/excessive power caused by occurrence of a failure; and a control instruction output unit which designates a connection source, a transmission electric energy, a connection destination, and a reception electric energy of the alternate route, and outputs a control instruction to power routers of the connection source and the connection destination.

The present invention which solves the problem relates to a control method for a power network system in which a plurality of grids each including a power generating apparatus, a power accumulating apparatus, a load apparatus, a power network, and a power router and dispersed so that they can be autonomous are connected via power routers and power transmission lines, which is controlled so that sum of inflow power and outflow power in the power router will be zero, and which asynchronously interchanges power among the grids, characterized in that the power network system further includes a controller connected to each of the power routers via a communication network, and the controller obtains a reception electric energy and a transmission electric energy in each of the power routers; determines a failure in a power router or a power transmission line on the basis of the obtained electric energies; searches for an alternate route so as to solve deficient/excessive power caused by occurrence of a failure; and designates a connection source, a transmission electric energy, a connection destination, and a reception electric energy of the alternate route, and outputs a control instruction to power routers of the connection source and the connection destination.

The present invention which solves the problem relates to a control program for controlling a power network system formed by connecting a plurality of grids each including a power generating apparatus, a power accumulating apparatus, a load apparatus, a power network, and a power router and dispersed so that they can be autonomous via the power routers and power transmission lines, controlled so that sum of inflow power and outflow power in the power router will be zero, and asynchronously interchanging power among the grids, characterized in that the power network system further includes a controller connected to each of the power routers via a communication network, and makes the controller execute: an electric energy obtaining process for obtaining a reception electric energy and a transmission electric energy in each of the power routers; a failure determining process for determining a failure in a power router or a power transmission line on the basis of the obtained electric energies; an alternate route searching process for searching for an alternate route so as to solve deficient/excessive power caused by occurrence of a failure; and a control instruction output process for designating a connection source, a transmission electric energy, a connection destination, and a reception electric energy of the alternate route, and outputting a control instruction to power routers of the connection source and the connection destination.

Advantageous Effects of Invention

According to the present invention, when some failure occurs in the case where power interchanges are performed among grids, an alternate route can be searched at high speed in consideration of a deficiency/excess amount of power.

BRIEF DESCRIPTION OF DRAWINGS

FIG. 4 is a diagram illustrating an example of a connection information management table.
FIG. 5 is a diagram illustrating an example of an allowable power transmission capacity management table.
FIG. 8 is a diagram illustrating node information.
FIG. 10 is a diagram illustrating a connection information management table (in the normal time).
FIG. 11 is a diagram illustrating an allowable power transmission capacity management table (in normal time).
FIG. 13 is a diagram illustrating the connection information management table (updated after failure occurrence).
FIG. 14 is a diagram illustrating the allowable power transmission capacity management table (updated after failure occurrence).
FIG. 17 is a diagram illustrating the allowable power transmission capacity management table (second update).
FIG. 19 is a diagram illustrating a process state in the case of using the power router 5 as a process node again.
FIG. 21 is a diagram illustrating the allowable power transmission capacity management table (third update).
FIG. 24 is a diagram illustrating a process state in the case of using a power router 3 as a process node.
FIG. 26 is a diagram illustrating the allowable power transmission capacity management table (fourth update).

DESCRIPTION OF EMBODIMENTS

The present invention relates to a power network system and a control method and a control program for a power network system. More particularly, the present invention relates to a power network system, a control method for a power network system, and a control program for a power network system formed by connecting a plurality of grids each including a power generating apparatus, a power accumulating apparatus, a load apparatus, a power network, and a power router and dispersed so that they can be autonomous via the power routers and power transmission lines, controlled so that sum of inflow power and outflow power in the power router will be zero, and asynchronously interchanging power among the grids.

<Configuration>

Figure 1:
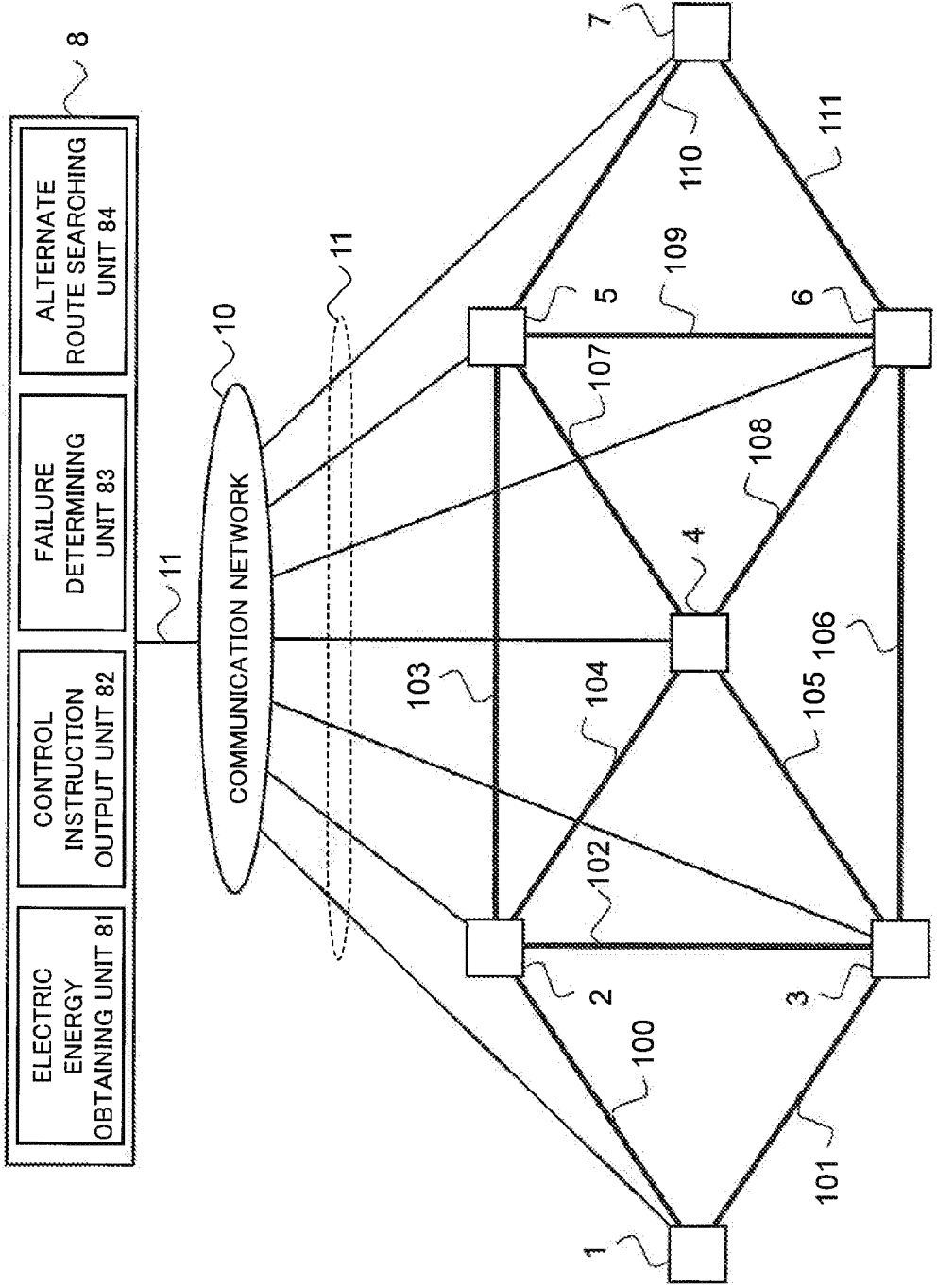
FIG. 1 is a configuration diagram of a power network system.

FIG. 1 is a configuration diagram of a power network system of an embodiment of the present invention. The embodiment is constructed by a plurality of power routers 1-7, power transmission lines 100-111 connecting the power routers, a controller 8, a communication network 10, and communication lines 11. In addition, FIG. 1 is an example in which 7 power routers are connected by 12 power transmission lines. However, the number of power routers, the number of power transmission lines, and the power routers connected by the transmission lines are not limited to the example of the diagram.

The power routers 1-7 are connected to arbitrary other power routers by the power transmission lines 100-111. By the connection, grids are connected. The power routers 1-7 transmit an electric energy designated by the controller 8 to a designated power transmission line or receive power from a designated power transmission line (that would be mentioned later).

Figure 2:
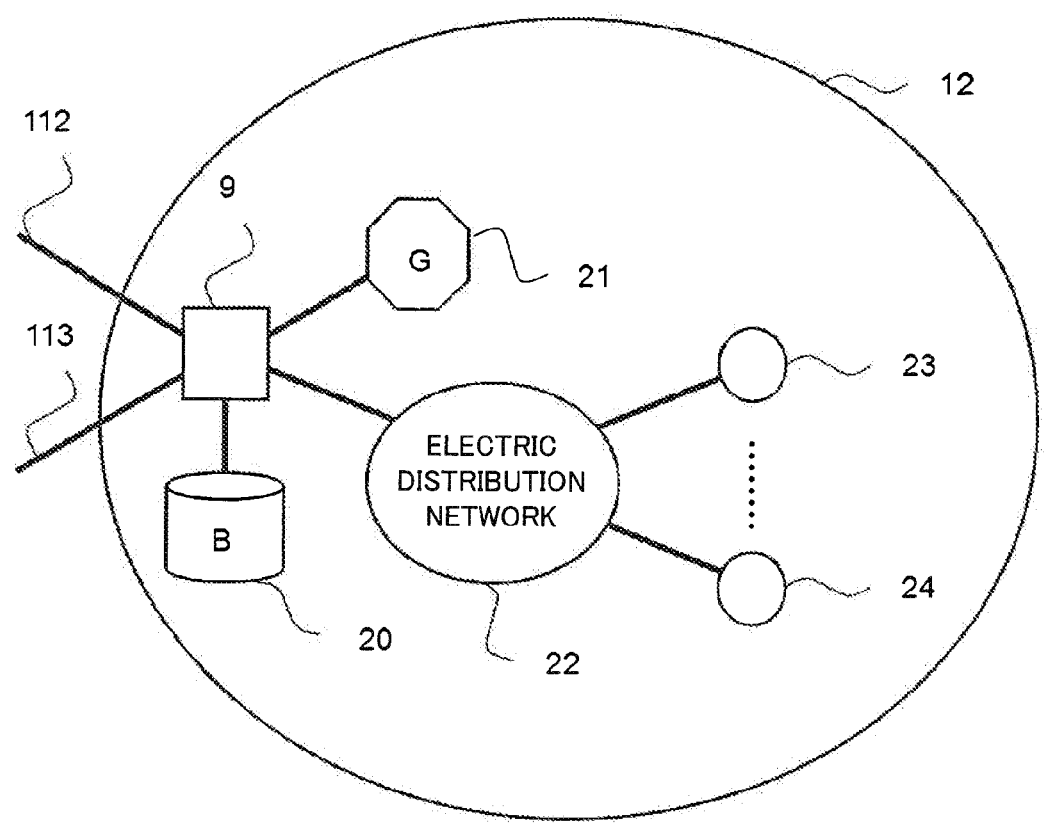
FIG. 2 is a configuration diagram of a grid.

FIG. 2 is a configuration diagram illustrating an example of a grid 12. The grid 12 has a power router 9, a power storage device (power accumulating apparatus) 20, a dispersed power supply (power generating apparatus) 21, an electric distribution network 22, one or more consumers (load apparatuses) 23-24. The power storage device 20 is a chargeable/dischargeable device such as an accumulator. Although the power router 9 is connected to the power transmission lines 112, 113 to the outside of the grid, one power storage device 20, the distributed power supply 21, and the electric distribution network 22, the numbers of connections and the kinds of devices connected are not limited. The grid 12 is an independent power system. In the grid, the consumers 23-24 receive power from the electric distribution network 22. Although not illustrated in FIG. 2, a distributed power supply such as a solar cell or a secondary battery may be directly connected to the electric distribution network, and the distributed power supplies send power to the electric distribution network. When power is deficient, the grid 12 receives power from another grid via the power router 9. In the case where the power is excessive, the grid 12 gives power to the other one or more grids.

As described above, the power routers 1-7 and 9 transmit power received from the other power routers, the distributed power supply, or the like to the other power routers and the electric distribution network in accordance with an instruction of the controller 8. In other words, the sum of power (which is expressed as a positive number) flowing into a power router and power (which is expressed by a negative number) flowing out from the power router will be 0. As a realization example of the power routers 1-7 and 9, there is a multi-terminal asynchronous interconnected device described in Patent Literature 1.

The power transmission lines 100-113 generally have a power transmission capacity as a maximum capacity which can be transmitted, and transmit power which does not exceed the transmission capacity. Generally, power transmission cost such as consignment charge occurs to the power transmission lines in accordance with the amount of power transmitted. The power transmission capacity and the power transmission cost may be different by the power transmission lines.

Referring again to FIG. 1, the characteristic configuration of the embodiment will be described. The controller 8 is connected to the power routers 1-7 via the communication lines 11 and the communication network 10.

The communication network 10 is, for example, the Internet. To each of the controller 8 and the power routers 1-7, a network address (for example, an IP (Internet Protocol) address) is given.

The communication line 11 transmits communication data between the controller 8 and the power routers 1-7 via the communication network 10. The communication data includes control information transmitted from the controller 8 to the power routers 1-7 and includes state notification information transmitted from the power routers 1-7 to the controller 8. By employing power line communication using a power line as a communication line, it is possible to share a media of the power transmission line with a media of the communication line.

The controller 8 has an electric energy obtaining unit 81, a control instruction output unit 82, a failure determining unit 83, and an alternate route searching unit 84.

Each of the power routers 1-7 measures an amount of power transmitted or received of a power transmission line to which each of the power routers is connected, and notifies the controller 8 of the amount via the communication network 10 and the communication line 11.

The electric energy obtaining unit 81 obtains the reception electric energy and the transmission electric energy in the power routers 1-7. In addition to the management of the electric energies, management of the power transmission capacity or unused capacity, and the like of each power transmission line, monitoring of the states of the power routers 1-7, and management of topology information of a power network constructed by the power routers and the power transmission lines are performed.

The control instruction output unit 82 instructs the amount of power to be transmitted or received and a connection destination to the power routers 1-7.

The power routers 1-7 detect that the power instructed by the controller 8 cannot be transmitted or received due to some failure such as disconnection of the power transmission lines or a failure of the power router as the connection destination, and notify the controller 8 of the detection via the communication network 10 and the communication lines 11.

The failure determining unit 83 determines a failure of the power router or the power transmission line on the basis of a change in the electric energy. When a failure is determined, the topology information or the unused capacity information of each power transmission line, and the like is updated.

The alternate route searching unit 84 searches for an alternate route so as to solve excess or deficiency power caused by the occurrence of the failure, and generates control information including the amount of power transmitted or received and a connection destination.

The control instruction output unit 82 designates the connection source, the transmission electric energy, the connection destination, and the reception electric energy of the alternate route, and outputs a control instruction to the power routers of the connection source and the connection destination.

As the controller 8, an information processing apparatus, for example, a PC (Personal Computer) or a server for a service provider which partially manages a power network system, or an administrator of the power network system (for example, an administrator of a power network system in a large-scaled factory) is assumed.

Each of processes of the controller 8 is realized by executing a control program stored in the controller 8. The control program is stored in a storage medium and may be read by the controller 8.

<Operation>

First, the premise of this embodiment is described. The controller 8 instructs an amount of power transmitted to the power routers 1-7 or an amount of power received from the power routers 1-7 and a connection destination via the communication network 10, and interchanges power in a power network constructed by the power routers 1-7 and the power transmission lines 100-111.

Figure 3:
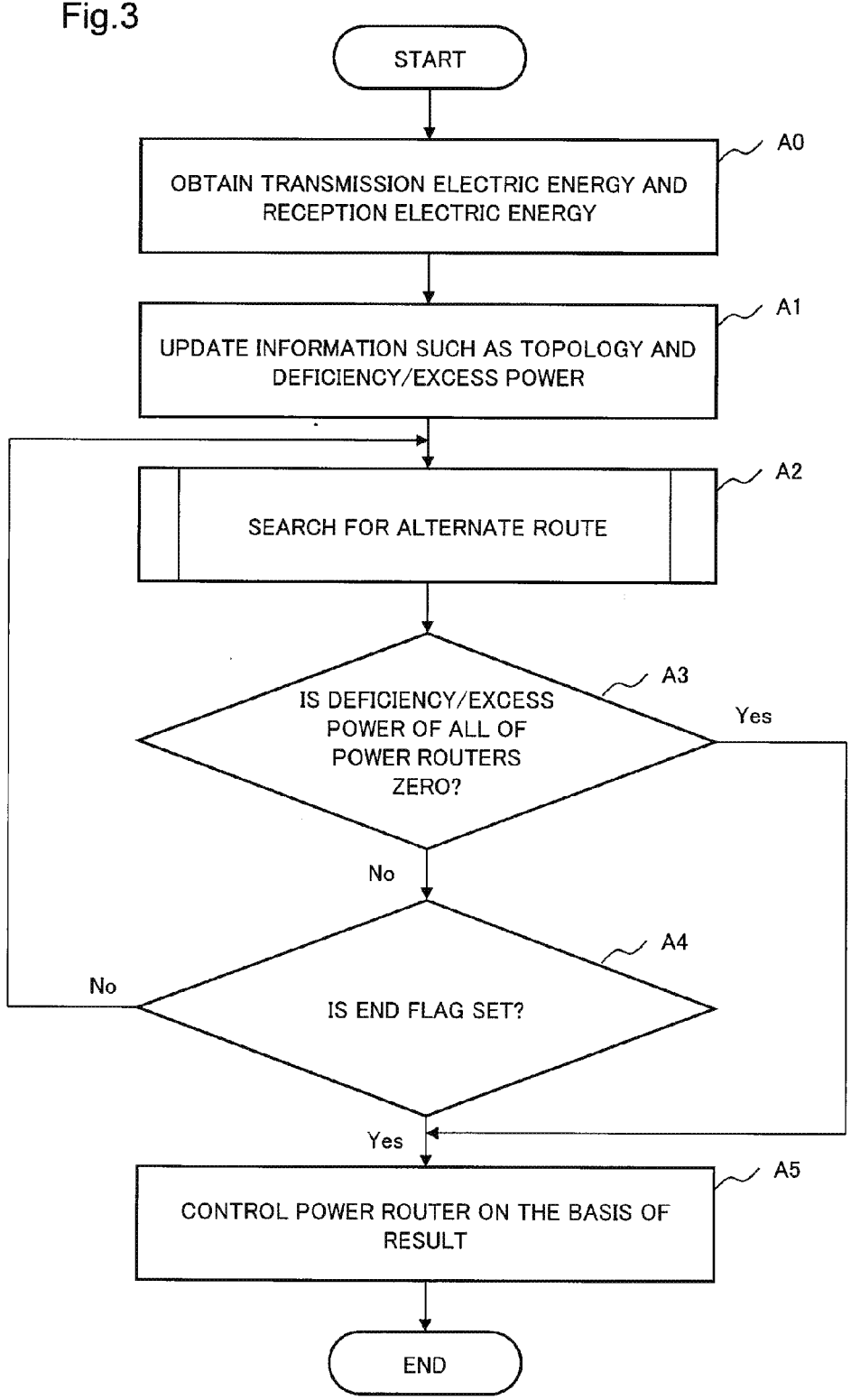
FIG. 3 is an alternate route searching flowchart (main).

FIG. 3 is an alternate route searching flowchart in the case where a specific power transmission line or power router is not available due to a failure or the like. With reference to the flowchart, the operation of the embodiment will be described.

Step A0:

In normal time, the controller 8 designates the electric energy for the power routers 1-7 and obtains the reception electric energy and the transmission electric energy in the power routers 1-7.

Step A1:

When a notification of an electric energy change due to some failure such as disconnection of a transmission power line or a failure in a power router as a connection destination is received, the controller 8 determines occurrence of a failure. The controller 8 updates topology information about the corresponding failure place, allowable power transmission capacity in each power transmission line, power excessively flowing in each of the power routers or deficient power in each of the power routers as the result of the failure. Although not illustrated, the controller 8 manages the transmission power or reception power instructed to the input/output of each of the power routers.

FIG. 4 illustrates an example of a connection information management table 30 used for topology information management. In the connection information management table 30, a connection source power router (hereinafter, called a connection source node) is indicated in each row and a connection destination power router (hereinafter, called a connection destination node) is indicated in each column. As the elements, 1 is indicated when a connection source node is connected to a connection destination node by a power transmission line, and 0 is indicated when a connection source node is not connected. In the example of FIG. 4, it is illustrated that, for example, the power router 1 and the power router 2 are connected. In the case where a specific power transmission line is disconnected by failure information, the element indicating a corresponding power transmission line is updated to 0. In the case where a power router cannot be used by a failure in the power router, elements in the row and column related to the corresponding power router are updated to 0.

FIG. 5 illustrates an example of an allowable power transmission capacity management table 40. In the allowable power transmission capacity management table 40, a connection source node is indicated in each row, and a connection destination node is indicated in each column. As the element, a maximum amount of power which can be transmitted from the connection source node to the connection destination node by the power transmission line is shown. In the example of FIG. 5, it is indicated that the unit of the transmission power capacity is kW, and power of 200 kW can be transmitted from the power router 1 to the power router 2 (similarly, from the power router 2 to the power router 1). For example, in the case where the power router 2 and the power router N are connected by a power transmission line having power transmission capacity of at most 200 kW and power of 100 kW is transmitted from the power router 2 to the power router N, as illustrated in FIG. 5, in the allowable power transmission capacity management table, it is managed on assumption that power of at most 100 kW (=200−100) can be transmitted from the power router 2 to the power router N, and power of at most 300 kW (=200−(−100)) can be transmitted from the power router N to the power router 2. In the case where a specific power transmission line is disconnected by failure information, the element indicating the corresponding power transmission line is updated to 0. In the case where power router cannot be used due to a failure in the power router, elements in the row and column related to the corresponding power router are updated to 0.

The connection information management table 30 and the allowable power transmission capacity management table 40 can be also managed as a formula of matrix by sequentially allocating identifiers of power routers from 1. The case where only power transmission only in one direction is allowed due to some limitation can be also handled by a management of expressing a connection source node in each row and a connection destination node in each column.

The allowable power transmission capacity can be also calculated from the power transmission amount or the power reception amount instructed by the controller 8, and the power transmission capacity of each of the power transmission lines.

Figure 6:
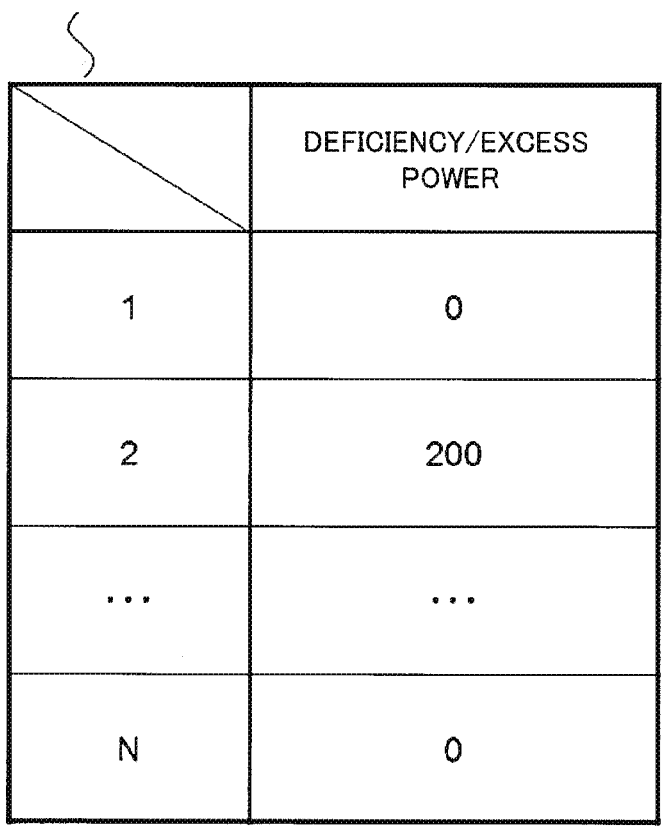
FIG. 6 is a diagram illustrating an example of a deficiency/excess power management table.

FIG. 6 illustrates an example of a deficiency/excess power management table 50. In the deficiency/excess power management table 50, a power router is indicated in each row. When an excessive power flows in the power router, the power is indicated by a positive number. When power excessively outflows (that is, power is deficient), the power is indicated by a negative number. The example of FIG. 6 illustrates that the unit of the deficiency/excess power is kW, and power of 200 kW excessively flows into the power router 2 for some reason. In the case where a specific power transmission line is disconnected due to failure information, the transmission electric energy is updated as positive number (power excess) for a power router which transmits power by using the power transmission line, and the transmission electric energy is updated as negative number (power deficiency) for a power router which receives power by using the power transmission line. In the case where a power router cannot be used by a failure in the power router, each element of the rows related to the power routers which transmit and receive power to and from the corresponding power router is updated. A positive number is set for the power router which transmits power to the failed power router, and a negative number is set for the power router which receives power from the failed power router.

Figure 7:
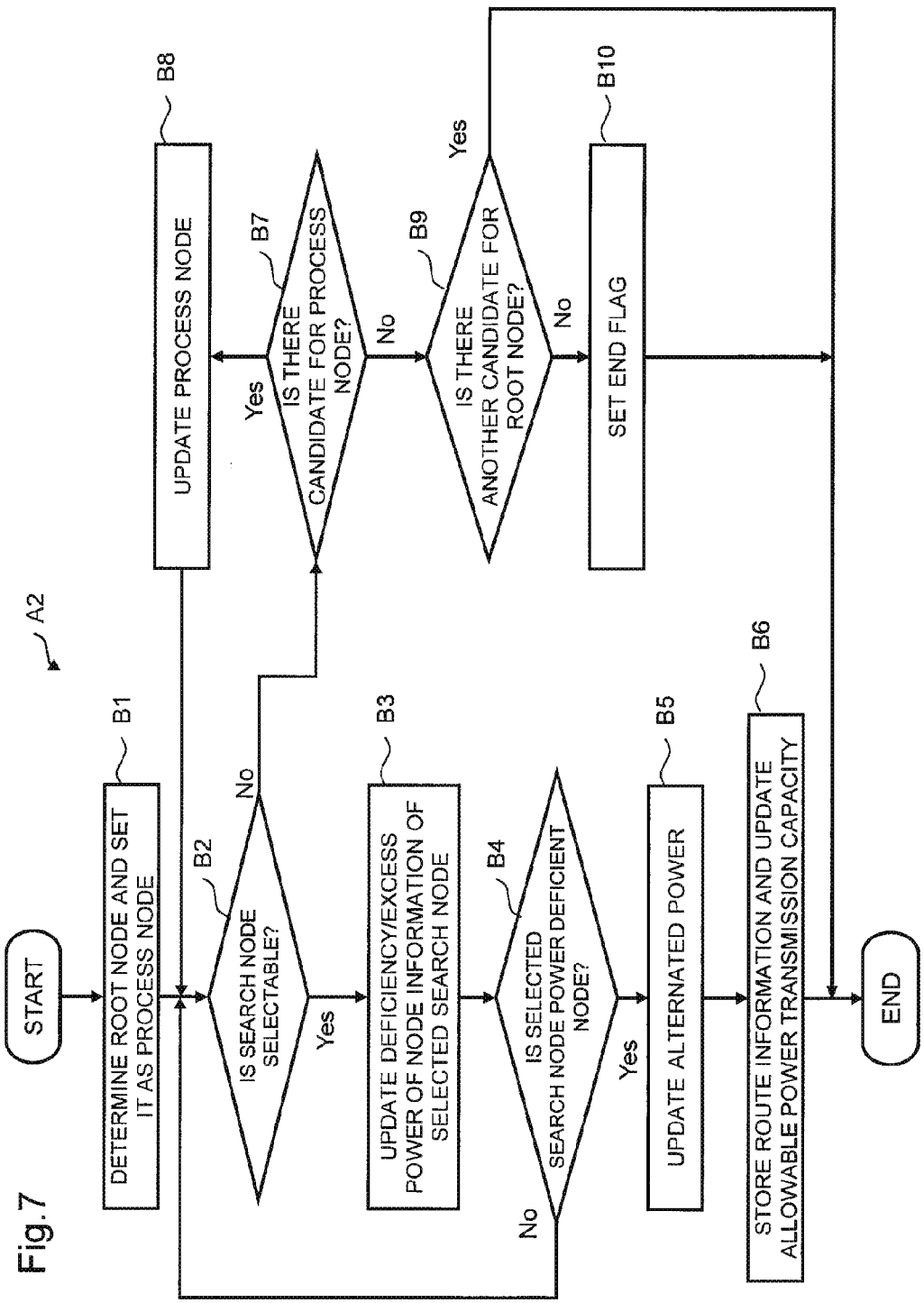
FIG. 7 is an alternate route searching flowchart (details).

Step A2:

After updating the connection information management table 30, the allowable power transmission capacity management table 40, and the deficiency/excess power management table 50, the controller 8 searches for an alternate route. FIG. 7 is a flowchart for explaining detailed process in the step A2 in the controller 8. With reference to the flowchart, search for an alternate route will be described.

Step B1:

To retrieve an alternate route, the controller 8 selects one power router having excessive power in the deficiency/excess power management table 50 as a root node, and starts the route search by a breadth first search from the selected root node.

Since the breadth first search is a general technique, the detailed description will not be given here. In the breadth first search, there is a method of performing a breadth first search by using an FIFO (First-In First-Out) queue. In this case, a node connected to the root node is added to the FIFO queue and, after that, one node is taken out from the FIFO queue. A process of adding all of nodes connected to the taken node to the FIFO queue and, after that, taking out one node from the FIFO queue is repeated. There is a case where it is limited not to add a node visited once to the FIFO queue. In the search method, even a node visited once but came from another node (that is, from a different route) is added to the FIFO queue. By the operation, a failure place can be bypassed by a plurality of alternate routes.

FIG. 8 illustrates node information 60 used in the alternate route searching process in step A2. The node information 60 corresponds to node information added to the FIFO queue. In this case, a node refers to a power router at the time of performing the process of step A2. The node information 60 includes a visit order list, interchange power, and deficiency/excess power. The visit order list is to manage identifiers of nodes followed from the root node by a list and expresses a path of an alternate route. The interchange power indicates power transmitted by using the alternate route indicated by the node information (for example, the unit is kW). The deficiency/excess power indicates deficiency or excess of a power (for example, the unit is kW) as a result of transmitting interchange power which will be described later by using the alternate route indicated by the node information.

When the root node is determined, the controller 8 generates the node information 60 by using the root node as a process node. At this time, as the node information, the identifier of the node (power router) is added to the visit order list. The controller 8 writes, as the deficiency/excess power, excess power of the process node in the deficiency/excess power management table 50. Further, the controller 8 stores the deficiency/excess power as interchange power.

Step B2:

The controller 8 refers to the connection information management table 30 and checks whether at least one node which is not selected as a search node exists or not among the nodes connected to the process node. At this time, whether a node can be selected as a search node or not is determined by (1) whether there is a node in which the identifier of a node to be selected is not included in the visit order list included in the node information 60 of the process node or not and (2) whether or not there is a node in which the allowable power transmission capacity of a node to be selected from the process node is not 0 with reference to the allowable power transmission capacity management table 40.

When a search node can be selected, the controller 8 advances towards step B3. When a node which can be selected as a search node does not exist, the controller 8 advances towards step B7.

Step B3:

The controller 8 selects one of selectable search nodes. The controller 8 generates the node information 60 for the selected search node. The visit order list of the node information 60 of the search nodes is obtained by adding the node identifier of the search node to the visit order list of the process nodes. The interchange power of the node information 60 of the search node is smaller one of the allowable power transmission capacity of the search node from the process node in the allowable power transmission capacity management table 40 and the interchange power in the node information 60 of the process node (when the values are equal, the equal value is employed). The deficiency/excess power of the node information 60 of the search node is obtained by adding the determined interchange power to the deficiency/excess power of the search node in the deficiency/excess power management table 50.

Step B4:

The controller 8 checks whether the search node in the deficiency/excess power management table 50 is a node whose deficiency/excess power is a negative number, that is, a node having deficient power. When the selected search node is a node having deficient power, the controller 8 advances towards step B5. When the selected node is not a node having deficient power, the generated node information 60 of the search node is added to the FIFO queue, and the controller 8 advances towards step B2 and continues the process.

Step B5:

The controller 8 updates the alternated power. At this time, the search node is a node having deficient power in the deficiency/excess power management table 50. Consequently, (1) when the absolute value of the deficient power of the search node in the deficiency/excess power management table 50 is equal to or larger than the interchange power in the node information 60 of the search node, the alternated power is set to the interchange power in the node information 60 of the search node. (2) When the absolute value of the deficient power of the search node in the deficiency/excess power management table 50 is smaller than the interchange power in the node information 60 of the search node, the alternated power is set to the absolute value of the deficient power of the search node in the deficiency/excess power management table 50. In simple terms, when the deficient power is large, all of the interchange power is given. When the deficient power is small, only the deficient amount is given. After completion of the updating of the alternated power, the controller 8 advances towards step B6.

Step B6:

After completion of the updating of the alternated power, the controller 8 determines that the alternated power can be given in the route of the visit order list in the node information 60 of the search node. The controller 8 stores the route (connection source and connection destination) and the interchange power (transmission electric energy and transmission electric energy). Further, the controller 8 updates the allowable power transmission capacity management table 40 and the deficiency/excess power management table 50 on the basis that the alternated power is given in the route, and finishes step A2.

Step B7:

In the case where a node which can be selected as a search node does not exist in step B2, a check is made to see whether there is a candidate for the process node or not. When a process is performed by using an FIFO queue in the alternate route search, a candidate for a process node is a node existing in the FIFO queue. When there is a candidate for a process node, the controller 8 advances towards step B8. When there is no candidate for a process node, the controller 8 advances towards step B9.

Step B8:

The controller 8 selects a candidate for a process node and sets it as a process node. Subsequently, the controller 8 advances towards step B2.

Step B9:

When a candidate for a process node does not exist, whether or not there is another candidate which can become a root node is checked. A candidate for a root node is a power router other than the root node which is presently selected in the power routers having excess power in the deficiency/excess power management table 50. When there is another candidate for a root node, the controller 8 finishes the step A2. When there are no other candidates for the root node, the controller 8 advances towards step B10.

Step B10:

The controller 8 sets the end flag to 1 indicating "end". The end flag is used for determination of whether the alternate route searching process is finished or not, and 0 indicating that the process is not finished is set as an initial value. After completion of the setting of the end flag, the step A2 is finished.

Referring again to the main flow illustrated in FIG. 3, the description of the operation will be continued.

Step A3:

When the process of searching an alternate route in step A2 is completed, the controller 8 checks whether the deficiency/excess power of all of the power routers is 0 or not by referring to the deficiency/excess power management table 50. When the deficiency/excess powers of all of the power routers is 0, the controller 8 advances towards step A5. When the deficiency/excess powers of all of the power routers is not 0, the controller 8 advances towards step A4.

Step A4:

The controller 8 checks whether the end flag is set to 1 or not. When the end flag is set to 1 in step B10, the controller 8 determines that the further alternate route search is impossible and advances towards step A5. When the alternate route search is finished in a state where the end flag is not set to 1 in step B9, the controller 8 determines that the alternate route search can be still performed, returns to the step A2, and continues the process.

Step A5:

The controller 8 generates control information of each of the power routers in accordance with the alternate route stored until then.

In the case where the controller 8 advances from the step A3 towards the step A5, the deficiency/excess power in all of the power routers can be set to 0. In the case where the controller 8 advances from the step A4 towards the step A5, the deficiency/excess power in all of the power routers could not have been set to 0, but the deficiency/excess electric energy is bypassed by the alternate route as much as possible. It is desired to temporarily bypass the route by the alternate route, calculate an overall optimum route in accordance with all of demands and supplies of all of powers after that, and take an action such as control of each of the power routers again.

EXAMPLES

Concrete examples of the above-described operation will be described below.

Figure 9:
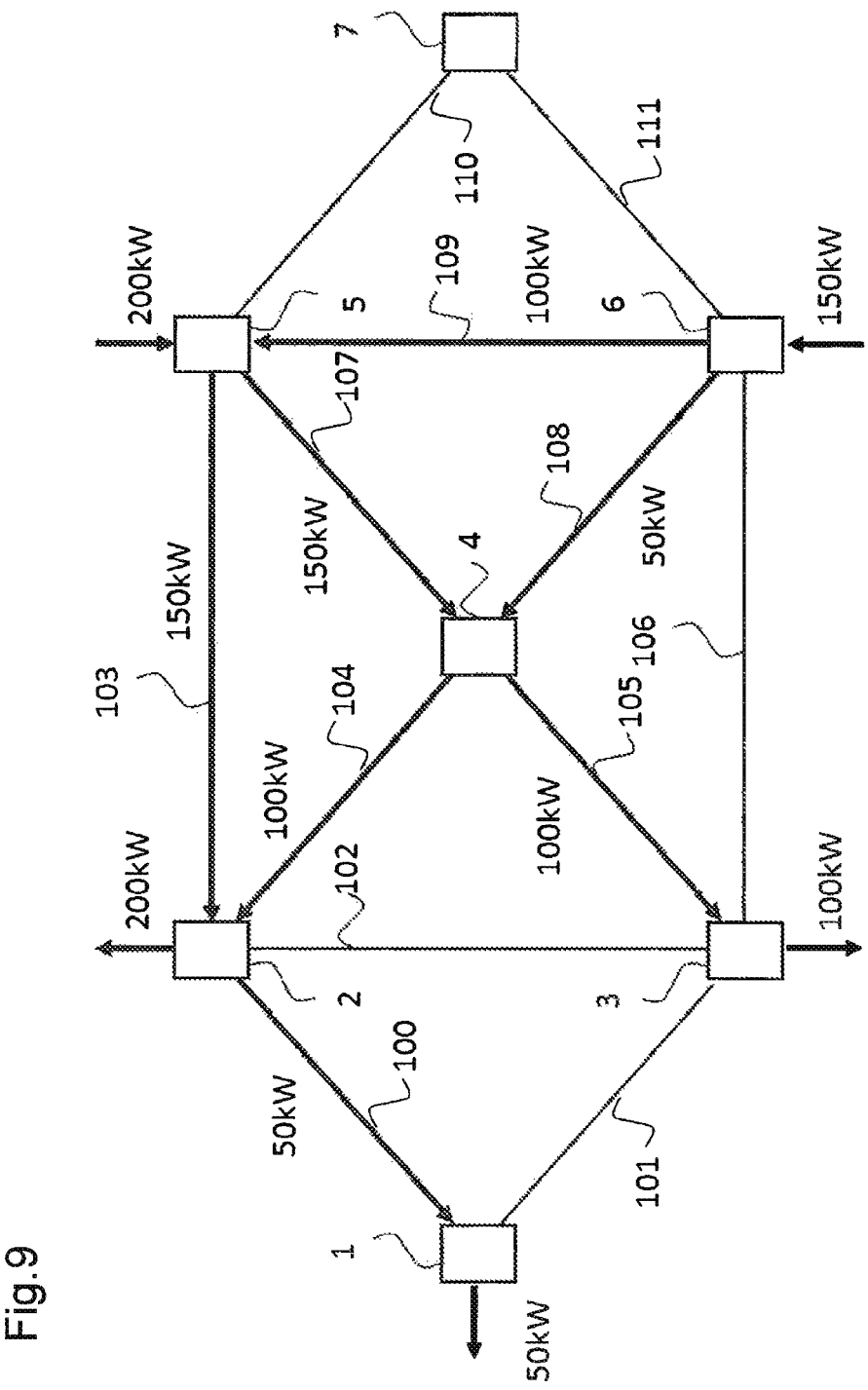
FIG. 9 is a diagram illustrating a state of power interchange among grids in a power network in the normal time.

FIG. 9 illustrates a state of power interchange among grids of a power network in normal time. In FIG. 9, the transmission power capacity of each of the power transmission lines 100-111 is set to 200 kW, and the controller 8 and the communication network 10 and the communication circuit 11 for communication performed between the controller 8 and the power routers 1-7 are not illustrated. In the example of FIG. 9, the following power interchange is performed, and the state of the power interchange is managed by the controller 8 (step A0).

(a) power router 1→grid to which power router 1 is connected: 50 kW
(b) power router 2→grid to which power router 2 is connected: 200 kW
(c) power router 3→grid to which power router 3 is connected: 100 kW
(d) grid to which power router 5 is connected→power router 5: 200 kW
(e) grid to which power router 6 is connected→power router 6: 150 kW
(f) power router 2→power router 1: 50 kW
(g) power router 4→power router 2: 100 kW
(h) power router 4→power router 3: 100 kW
(i) power router 5→power router 2: 150 kW
(j) power router 5→power router 4: 150 kW
(k) power router 6→power router 4: 50 kW
(l) power router 6→power router 5: 100 kW It is controlled so that the sum of the transmission electric energy and the reception electric energy will be zero in each power router. For example, in the power router 2, "transmission electric energy (200(b)+50(f))=reception electric energy (100(g)+150(i))" is satisfied.

Figure 12:
FIG. 12 is a diagram illustrating a deficiency/excess power management table (in normal time).

FIG. 10 is a connection information management table 31 managed by the controller 8 in normal time. FIG. 11 is an allowable power transmission amount capacity management table 41 managed by the controller 8 in normal time. FIG. 12 is a deficiency/excess power management table managed by the controller 8 in normal time. In each of the power routers 1 to 7, the sum of power (which is expressed as a positive number) flowing in each of the power routers 1 to 7 and power (which is expressed by a negative number) flowing out from the power router is 0.

The case where a failure occurs in the power router 4 for some reason and power interchange from the power router 4 and power interchange to the power router 4 cannot be performed will be considered.

By a notification that monitoring of the active/inactive state of the power router 4 is impossible or there is no power transmission of the power router 4 from the power routers 2, 3, or an inquiry to the power router 4, or the like, the controller 8 determines that a failure occurs in the power router 4 and power interchange via the power router 4 is impossible.

When it is determined that the power interchange via the power router 4 is impossible, the controller 8 updates the connection information management table 31, the allowable power transmission capacity management table 41, and the deficiency/excess power management table 51 (step A1).

Concretely, the controller 8 updates all of parts in which the power router 4 is the connection source node or the connection destination node in the connection information management table 31 to 0 (that is, it is not connected). Similarly, the controller 8 updates all of parts in which the power router 4 is the connection source node or the connection destination node in the allowable power transmission capacity management table 41 to 0 (that is, power cannot be transmitted). About the power routers 5, 6 in the deficient/excess power management table 51, the controller 8 updates the powers transmitted to the power router 4 from the power routers 5, 6 as excessive powers. About the power routers 2, 3 in the deficient/excess power management table 51, the controller 8 updates the powers transmitted to the power routers 2, 3 from the power router 4 as deficient powers.

Figure 15:
FIG. 15 is a diagram illustrating the deficiency/excess power management table (updated after failure occurrence).

FIG. 13 illustrates a connection information management table 32 updated after occurrence of a failure in the power router 4. All of parts in which the power router 4 is the connection source node or the connection destination node are updated to 0. FIG. 14 illustrates an updated allowable power transmission capacity management table 42. All of parts in which the power router 4 is the connection source node or the connection destination node are updated to 0. FIG. 15 illustrates an updated deficiency/excess power management table 52. Excessive power is written in the power routers 5, 6, and deficient power is written in the power routers 2, 3.

After updating each table, the controller 8 starts a process of searching for an alternate route (step A2).

As a process of searching for an alternate route, the controller 8 selects one of the power routers having excessive power in the deficiency/excess power management table 52 as a root node, and starts a route search by a breadth first search from the selected root node (step B1). Here, a case where the controller 8 selects the power router 5 having the largest excessive power as the root node will be considered.

Figure 16:
FIG. 16 is a diagram illustrating a process state in the case of using a power router 5 as a process node.

FIG. 16 illustrates an example of node information 61. The controller 8 generates the node information 61 using the power router 5 as the root node as a process node. As the node information of the power router 5, "5" as the identifier of the power router is stored in the visit order list as deficiency/excess power, "150" (the unit is kW but is not written) as excessive power of the process node in the deficiency/excess power management table 52 is stored as deficiency/excess power, and "150" as the excessive power is stored as interchange power.

Subsequently, the controller 8 refers to the connection information management table 32, and checks whether or not at least one node which has not been selected as a search node exists in the power routers connected to the power router 5 (step B2). In this case, the power router 5 is connected to the power routers 2, 6, and 7. Since (1) the power routers are not included in the visit order list of the node information of the power router 5 and (2) the allowable power transmission capacity from the power router 5 is not 0 in the allowable power transmission capacity management table 42, it is determined that the power routers can be selected as search nodes.

The controller 8 selects one search node from the selectable search nodes and generates the node information 61 (step B3). Here, a case where the controller 8 selects the power router 2 as a search node will be considered. The controller 8 generates the node information 61 of the power router 2 (FIG. 16). As the node information of the power router 2, "2" as the node identifier of the power router 2 is added to "5" in the visit order list included in the node information of the power router 5 as the process node in the visit order list. As the interchange power, "50" is set as the smaller value of "50" as the allowable power transmission capacity of the power router 2 as the search node from the power router 5 as the process node and the interchange power "150" in the node information of the power router 5. Further, the deficiency/excess power is set to "−50" obtained by adding "50" as the interchange power to "−100" as the deficiency/excess power of the power router 2.

The controller 8 checks whether or not the power router 2 as the search node is a node having deficient power in the deficiency/excess power management table 52 (step B4). Since the power router 2 is a node having deficient power, the alternated power is updated (step B5).

In this case, since "100" as the absolute value of the deficient power of the power router 2 as the search node is larger than "50" as the interchange power in the node information 61 of the power router 2, the controller 8 sets "50" as the interchange power in the node information 61 of the power router 2 as alternated power.

When the updating of the alternated power is completed, the controller 8 determines that the alternated power can be given in the route in the visit order list in the node information 61 of the power router 2 as the search node (step B6). That is, the controller 8 determines that (A) the power of 50 kW from the power router 5 to the power router 2 can be given, and stores the route and the interchange power. Further, the controller 8 determines that the power interchange is possible and updates the allowable power transmission capacity management table 42 and the deficiency/excess power management table 52.

FIG. 17 illustrates an allowable power transmission capacity management table 43 after the second update. As a result that the allowable power transmission capacity related to "connection source node 5→connection destination node 2" changes from "50" to "0", the allowable power transmission capacity related to "connection source node 2→connection destination node 5" is updated from "350" to "400".

Figure 18:
FIG. 18 is a diagram illustrating the deficiency/excess power management table (second update).

FIG. 18 illustrates a deficiency/excess power management table 53 after the second update. The excessive power of the power router 5 is updated from "150" to "100", and the deficient power of the power router 2 is updated from "−100" to "−50".

After the end of the process (step A2), the controller 8 refers to the deficiency/excess power management table 53 and checks whether the deficiency/excess power of all of the power routers are 0 or not (step A3). In this case, the deficiency/excess powers of all of the power routers are not 0, the controller 8 checks whether the end flag is set to 1 or not (step A4). Since the end flag has not been set to 1 in the processes until then, the controller 8 determines that the alternate route search is still possible, and performs the search for an alternate route again (step A2).

Also in the following process of searching for an alternate route, the controller 8 considers the case of selecting the power router 5 having the largest excess power as the root node, and generates node information 62 using the power router 5 as a process node (step B1).

FIG. 19 illustrates an example of node information 62. As the node information of the power router 5, "5" as the identifier of the power router is stored in the visit order list, "100" as excessive power of the process node in the deficiency/excess power management table 53 is stored as deficiency/excess power, and "100" as the excessive power is stored as interchange power.

Subsequently, the controller 8 can determine that at least one power router exists as a search node in the power router 5 (step B2), selects the power router 6 as a search node, and generates the node information 62 of the power router 6 (FIG. 19) (step B3). Since the visit order list, the deficiency/excess power, and the interchange power included in the node information 62 of the power router 6 can be designated by the above-described procedure, the description will not be repeated.

The controller 8 refers to the deficiency/excess power management table 53 and can determine that the power router 6 as a search node is not a node having deficient power (step B4).

Consequently, the controller 8 selects the power router 7 which has not been searched yet as a search node, and generates the node information 62 of the power router 7 (FIG. 19) (step B2→step B3).

FIG. 19 also illustrates that, in the route searching process, a search is performed by using the mechanism of the breadth first search, so that the node information of the power router 6 and the power router 7 is added to the FIFO queue.

Since the power router 7 is not a node having deficient power like the power router 6, the controller 8 further checks whether a search node exists or not (step B4→step B2).

Since a power router which can be selected as a search node does not exist in the power routers 2, 6, and 7 connected to the power router 5 as a process node, the controller 8 checks whether or not there is a candidate for a process node (step B7). In the example of FIG. 19, the node added to the FIFO queue is a process node candidate.

Consequently, the power router 6 at the head is changed to a process node (step B8), and whether a search node for the power router 6 exists or not is checked (step B2).

The controller 8 selects the power router 3 as the search node for the power router 6 as the process node and generates node information 63 for the power router 3 (step B3).

Figure 20:
FIG. 20 is a diagram illustrating a process state in the case of using a power router 6 as a process node.

FIG. 20 illustrates an example of the node information 63. As the node information of the power router 6 as the process node, [5, 6] is stored in the visit order list, "100" is stored as the interchange power, and "150" is stored as the deficiency/excess power. In this case, as the node information for the power router 3 as the search node, the search node identifier "3" is added to the visit order list of the power router 6 as the process node. After checking that the interchange power does not exceed the allowable power transmission capacity from the power router 6 as the process node to the power router 3 as the search node, "100" is set as the interchange power in the process node. Further, the deficiency/excess power is "0" obtained by adding "100" as the interchange power to "−100" as the deficiency/excess power of the power router 3.

Since the power router 3 is a node having deficient power, the alternated power is updated (step B4→step B5). Although the detailed description will not be given, in this case, the alternated power is 100.

The controller 8 performs the above process and determines that the alternated power can be given in the route of the visit order list in the node information 63 of the power router 3 as the search node (step B6). That is, the controller 8 determines that (B) the power of 100 kW from the power router 5 to the power router 6 and (C) the power of 100 kW from the power router 6 to the power router 3 can be given, and stores the routes and the interchange powers. Further, the controller 8 determines that the power interchange is possible, and updates the allowable power transmission capacity management table 43 and the deficiency/excess power management table 53.

Figure 22:
FIG. 22 is a diagram illustrating the deficiency/excess power management table (third update).

FIG. 21 illustrates an allowable power transmission capacity management table 44 after the third update. As a result that the allowable power transmission capacity related to "connection source node 5→connection destination node 6" changes from "300" to "200", the allowable power transmission capacity related to "connection source node 6→connection destination node 5" is updated from "100" to "200". As a result that the allowable power transmission capacity related to "connection source node 6→connection destination node 3" changes from "200" to "100", the allowable power transmission capacity related to "connection source node 3→connection destination node 6" is updated from "200" to "300". FIG. 22 illustrates a deficiency/excess power management table 54 after the third update. The excessive power of the power router 5 is updated from "100" to "0", and the deficient power of the power router 3 is updated from "−100" to "0".

Hereinafter, although the detailed description will not be given, the controller 8 checks the deficiency/excess power management table 54 and the end flag, further, determines that an alternate route search is possible, and performs the alternate route search again (step A3→step A4→step A2).

The controller 8 selects the power router 6 again as a process node and, further, performs processes similar to the above on the power routers 3, 5, and 7 as search nodes.

Figure 23:
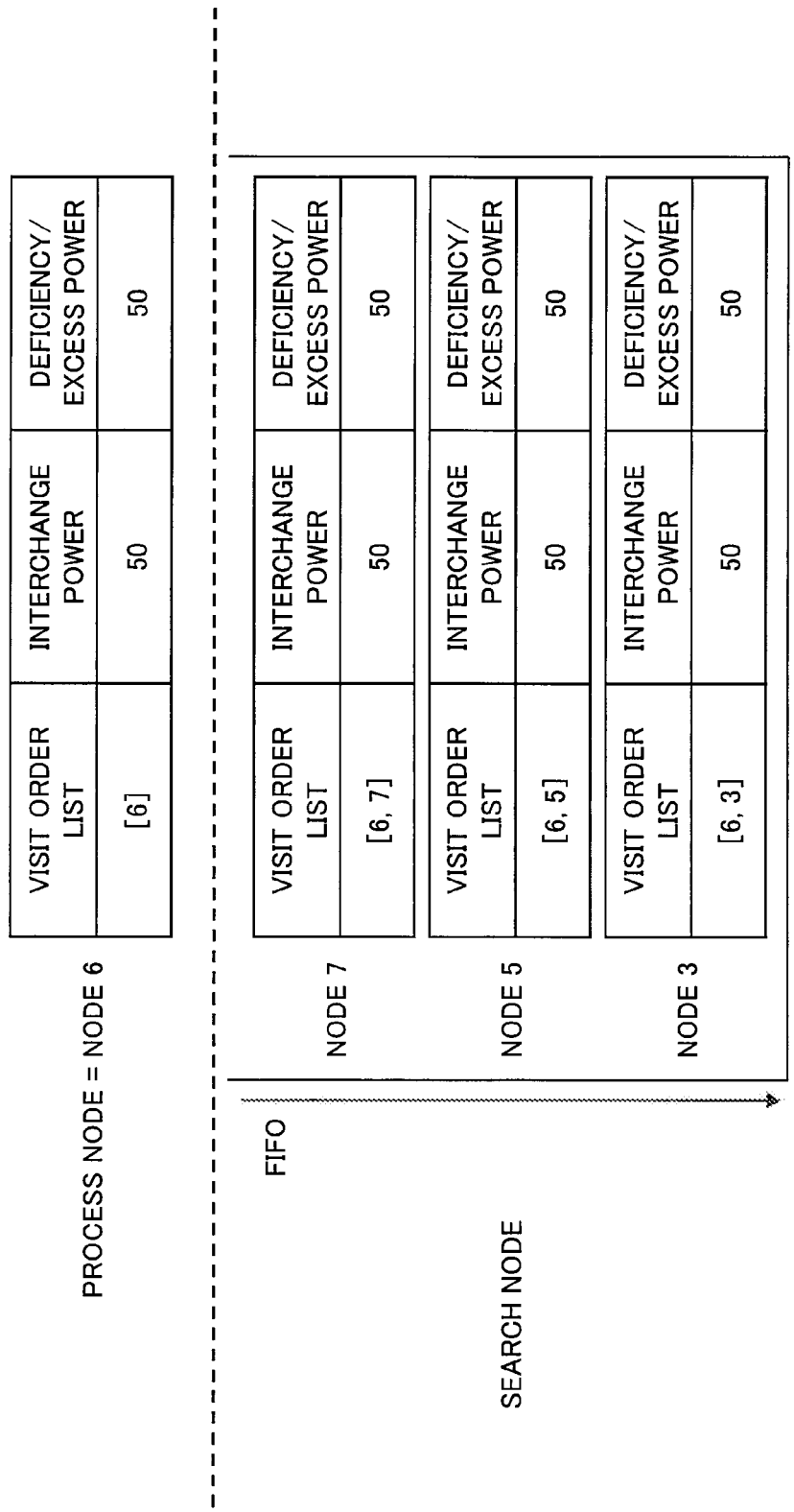
FIG. 23 is a diagram illustrating a process state in the case of using the power router 6 as a process node again.

FIG. 23 illustrates an example of node information 64. The controller 8 generates the node information 64 using the power router 6 as a process node, and adds the search node identifiers "3", "5", and "7" to the visit order list.

Since the power routers 3, 5, and 7 do not have deficient power and no power router which can be selected as a search node exists in the power routers 3, 5, and 7 connected to the power router 6 as a process node, the controller 8 checks whether or not there is a candidate for a process node (step B1→(step B2→step B3→step B4)×three times→step B2→step B7).

Further, the controller 8 changes the process node to the power router 3 and checks whether a search node for the power router 3 exists or not (step B8→step B2).

FIG. 24 illustrates an example of node information 65 obtained by deforming the node information 64. The controller 8 takes out the power router 3 as a process node, generates node information of the power router 1 on the basis of the process node, and adds the search node identifier "1" to the visit order list.

Since the power router 1 is not a node having deficient power, the node information of the power router 1 is stored in the FIFO queue. Subsequently, the power router 2 is selected as a search node, and node information 66 is generated (step B2→step B3→step B4→step B2).

Figure 25:
FIG. 25 is a diagram illustrating a process state in the case of using the power router 3 as a process node.

FIG. 25 illustrates an example of the node information 66. As the interchange power, the interchange power "50" in the process node is set. Further, the deficiency/excess power is set to "0" obtained by adding the interchange power "50" to "−50" as the deficiency/excess power of the power router 2.

Since the power router 2 is a node having deficient power, the alternated power is updated (step B3→step B4→step B5). In this case, the alternated power is 50.

After performing the above process, the controller 8 determines that the alternated power can be given in the routes in the visit order list in the node information 65 of the power router 2 as a search node (step B6). That is, the controller 8 determines that (D) the power of 50 kW from the power router 6 to the power router 3 and (E) the power of 50 kW from the power router 3 to the power router 2 can be given, and stores the routes and the interchange powers. Further, the controller 8 determines that the power interchange is possible, updates the allowable power transmission capacity management table 44 and the deficiency/excess power management table 54, and finishes the step A2.

Figure 27:
FIG. 27 is a diagram illustrating the deficiency/excess power management table (fourth update).

FIG. 26 illustrates an allowable power transmission capacity management table 45 after the fourth update. As a result that the allowable power transmission capacity related to "connection source node 6→connection destination node 3" changes from "100" to "50", the allowable power transmission capacity related to "connection source node 3→connection destination node 6" is updated from "300" to "350". As a result that the allowable power transmission capacity related to "connection source node 3→connection destination node 2" changes from "200" to "150", the allowable power transmission capacity related to "connection source node 2→connection destination node 3" is updated from "200" to "250". FIG. 27 illustrates a deficiency/excess power management table 55 after the fourth update. The excessive power of the power router 6 is updated from "50" to "0", and the deficient power of the power router 2 is updated from "−50" to "0". As a result, the deficiency/excess powers of all of the power routers 1-7 are 0.

The controller 8 determines that the deficiency/excess powers of all of the power routers 1-7 are 0 and controls the power routers 1 to 7 (step A3→step A5) on the basis of the result.

In this case, the interchange powers obtained by the alternate route searching process are calculated by subtracting the powers in the same power from the above routers (A)-(E).

(A) power router 5→power router 2: 50 kW
(B) power router 5→power router 6: 100 kW
(E) power router 3→power router 2: 50 kW
(F) power router 6→power router 3: 150 kW (=C+D)

Figure 28:
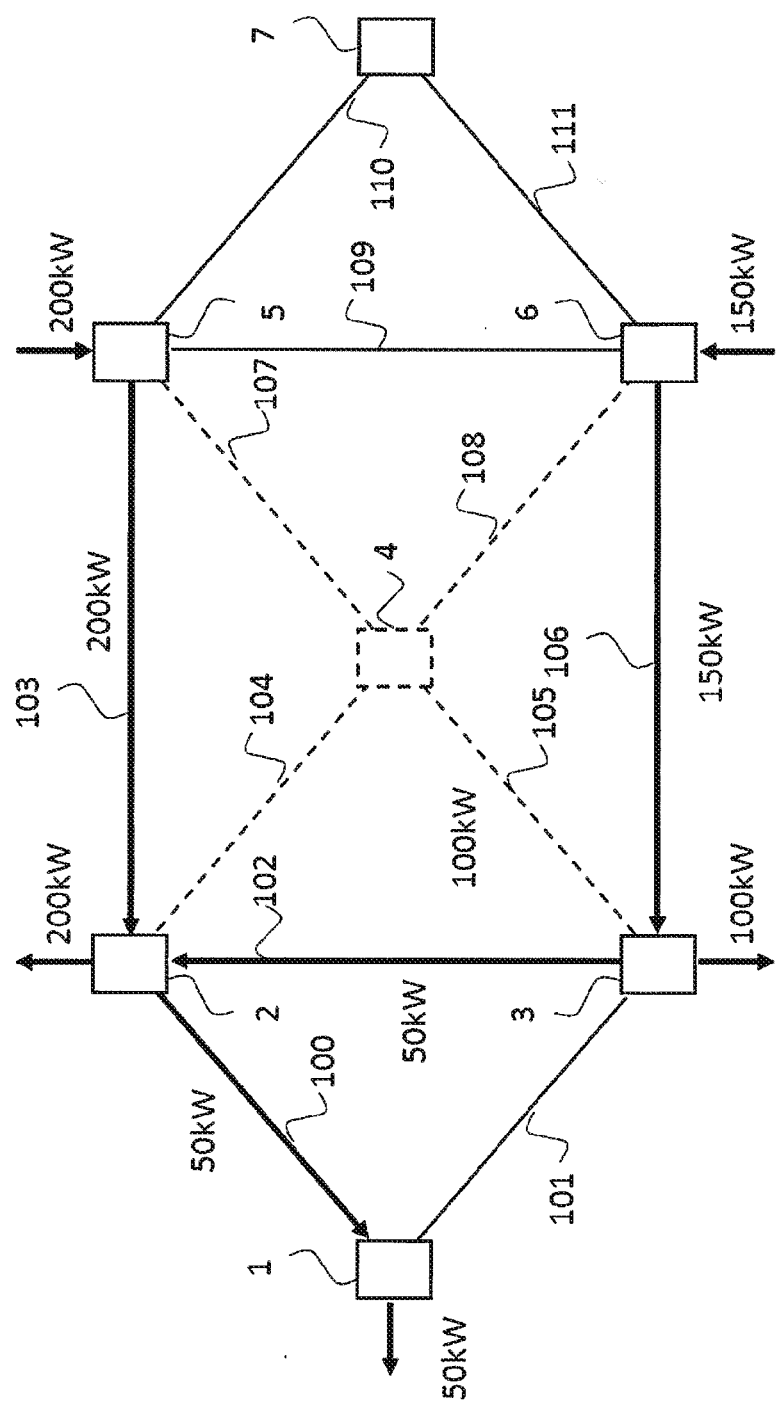
FIG. 28 is a diagram illustrating a state of power interchange among grids of a power network after an alternate route search.

FIG. 28 illustrates a power interchange state among the grids of the power network after the alternate route search.

In the system, originally, there are the interchange powers (a)-(l) illustrated in FIG. 9. The interchange powers related to power transmission to the power router 4 or power reception from the power router 4 are impossible. Consequently, the interchange powers (A)-(F) are newly added, so that the following power interchanges (a)-(f) and (m)-(o) obtained by adding the powers in the same power routers are performed finally.

(a) power router 1→grid to which power router 1 is connected: 50 kW
(b) power router 2→grid to which power router 2 is connected: 200 kW
(c) power router 3→grid to which power router 3 is connected: 100 kW
(d) grid to which power router 5 is connected→power router 5: 200 kW
(e) grid to which power router 6 is connected→power router 6: 150 kW
(f) power router 2→power router 1: 50 kW
(m) power router 5→power router 2: 200 kW
(n) power router 3→power router 2: 50 kW
(o) power router 6→power router 3: 150 kW <Effects>

In the embodiment, in the case where a failure occurs when the power interchange is performed among grids, the controller 8 determines the presence/absence of a failure occurrence and performs a breadth first search in consideration of the deficiency/excess amounts of the powers. In such a manner, while omitting an unnecessary route search, the alternate route can be retrieved at high speed.

The controller 8 selects the root node 5 from the power routers 5, 6 having excessive power, searches for the power router 2 having deficient power, sets an alternate route (5→2), temporarily interrupts the process, and performs the power interchange by the alternate route found. By repeating such operations, also in the case where all of alternate routes cannot be found, alternate routes are found as much as possible, and power interchange can be performed.

The controller 8 selects, as the root node, the power router 5 having the largest excessive power from the power routers 5, 6 having excessive power. By the selection, an alternate route can be retrieved efficiently. Also in the case where all of alternate routes cannot be found, the largest excessive power is solved with priority, and the power interchange can be performed as much as possible.

<Modifications>

The present invention is not limited to the foregoing embodiment but can be variously modified within the scope of the technical ideas of the present invention. Some modifications will be described.

In the embodiment, at the time of determining a root node, a power router having excessive power is selected as a candidate for the root node. Alternatively, a power router having deficient power can be also selected as a candidate for the root node. In this case, the determination has to be made by changing the criterion "excess" to "deficiency" and changing the criterion "deficiency" to "excess" in the steps of FIGS. 3 and 7.

In the embodiment, power flowing in a certain power router is expressed by a positive number, and power flowing out is expressed by a negative number. Alternatively, a process can be also performed by expressing power flowing in a certain power router by a negative number and expressing power flowing out by a positive number. Further, also in the case of performing a process by expressing power flowing in a certain power router by a positive number and expressing power flowing out by a negative number, as described above, at the time of determining a root node, a power router having deficient power can be selected as a candidate for the root node. The flows of the powers flowing in/out from a power router are merely expressed by positive and negative signs. When the criteria of the positive/negative signs and excess/deficiency are substantially determined, they can be determined and properly changed by a person concerned.

Although a power router having the largest excessive power is selected at the time of determining a root node in the embodiment, a power router having the smallest excessive power may be also selected. In such a manner, an alternate route can be retrieved more reliably.

Further, the present invention is not necessarily limited to the foregoing embodiments and examples but may be variously modified within the scope of the technical idea. The embodiments and examples may be properly combined and executed.

As obvious from the above description, the components can be configured by hardware. Alternatively, they can be also realized by a computer program. In this case, by a processor operating by a program stored in a program memory, functions and operations similar to those of the foregoing embodiments can be realized.

The whole or part of the exemplary embodiments disclosed above can be described as, but not limited to, the following supplementary notes.

(Supplementary Note 1)

A power network system formed by connecting a plurality of grids each including a power generating apparatus, a power accumulating apparatus, a load apparatus, a power network, and a power router and dispersed so that they can be autonomous, via the power routers and power transmission lines, controlled so that sum of inflow power and outflow power in the power router will be zero, and asynchronously interchanging power among the grids, characterized in that the power network system further includes a controller connected to each of the power routers via a communication network, and the controller includes:

an electric energy obtaining unit which obtains a reception electric energy and a transmission electric energy in each of the power routers;

a failure determining unit which determines a failure in a power router or a power transmission line on the basis of the obtained electric energies;

an alternate route searching unit which searches for an alternate route so as to solve deficient/excessive power caused by occurrence of a failure; and a control instruction output unit which designates a connection source, a transmission electric energy, a connection destination, and a reception electric energy of the alternate route, and outputs a control instruction to power routers of the connection source and the connection destination.

(Supplementary Note 2)

The power network system of Supplementary note 1, characterized in that the alternate route searching unit searches for an alternate route by a breadth first search.

(Supplementary Note 3)

The power network system according to claim 2, characterized in that the alternate route searching unit selects a root node from power routers having excessive power, searches for a power router having deficient power, and sets an alternate route, and the control instruction output unit outputs a control instruction related to power interchange each time an alternate route is searched.

(Supplementary Note 4)

The power network system of Supplementary note 3, characterized in that the alternate route searching unit selects a power router having largest excessive power as a root node.

(Supplementary Note 5)

A control method for a power network system in which a plurality of grids each including a power generating apparatus, a power accumulating apparatus, a load apparatus, a power network, and a power router and dispersed so that they can be autonomous are connected via power routers and power transmission lines, which is controlled so that sum of inflow power and outflow power in the power router will be zero, and which asynchronously interchanges power among the grids, characterized in that the power network system further includes a controller connected to each of the power routers via a communication network, and the controller obtains a reception electric energy and a transmission electric energy in each of the power routers;

determines a failure in a power router or a power transmission line on the basis of the obtained electric energies;

searches for an alternate route so as to solve deficient/ excessive power caused by occurrence of a failure; and designates a connection source, a transmission electric energy, a connection destination, and a reception electric energy of the alternate route, and outputs a control instruction to power routers of the connection source and the connection destination.

(Supplementary Note 6)

The control method for a power network system of Supplementary note 5, characterized in that the alternate route search is an alternate route search by a breadth first search.

(Supplementary Note 7)

The control method for a power network system of Supplementary note 6, characterized in that the alternate route search is an alternate route search which selects a root node from power routers having excessive power and searches for a power router having deficient power, and the control instruction output is a control instruction output related to power interchange each time an alternate route is searched.

(Supplementary Note 8)

The control method for a power network system of Supplementary note 7, characterized in that the alternate route search is an alternate route search which selects a power router having largest excessive power as a root node.

(Supplementary Note 9)

A control program for controlling a power network system formed by connecting a plurality of grids each including a power generating apparatus, a power accumulating apparatus, a load apparatus, a power network, and a power router and dispersed so that they can be autonomous via the power routers and power transmission lines, controlled so that sum of inflow power and outflow power in the power router will be zero, and asynchronously interchanging power among the grids, characterized in that the power network system further includes a controller connected to each of the power routers via a communication network, and makes the controller execute:

an electric energy obtaining process for obtaining a reception electric energy and a transmission electric energy in each of the power routers;

a failure determining process for determining a failure in a power router or a power transmission line on the basis of the obtained electric energies;

an alternate route searching process for searching for an alternate route so as to solve deficient/excessive power caused by occurrence of a failure; and a control instruction output process for designating a connection source, a transmission electric energy, a connection destination, and a reception electric energy of the alternate route, and outputting a control instruction to power routers of the connection source and the connection destination.

(Supplementary Note 10)

The control program of Supplementary note 9, characterized in that the alternate route searching process is an alternate route searching process by a breadth first search.

(Supplementary Note 11)

The control program of Supplementary note 10, characterized in that the alternate route searching process is an alternate route searching process of selecting a root node from power routers having excessive power and searching for a power router having deficient power, and the control instruction output process is a process of outputting a control instruction related to power interchange each time an alternate route is searched.

(Supplementary Note 12)

The control program of Supplementary note 11, characterized in that the alternate route searching process is an alternate route searching process of selecting a power router having largest excessive power as a root node.

This application is based upon and claims the benefit of priority from Japanese patent application No. 2012-152955, filed on Jul. 6, 2012, the disclosure of which is incorporated herein in its entirety by reference.

REFERENCE SIGNS LIST 1-7 power router
8 controller
9 power router
10 communication network
11 communication line
12 grid
20 power storing apparatus (power accumulating apparatus)
21 distributed power supply (power generating apparatus)
22 electric distribution network
23, 24 consumer (load apparatus)
30-32 connection information management table
40-45 allowable power transmission capacity management table
50-55 deficiency/excess power management table
60-66 node information
81 electric energy obtaining unit
82 control instruction output unit
83 failure determining unit
84 alternate route searching unit
100-113 power transmission line

The invention claimed is:

1. A power network system formed by connecting a plurality of grids each including a power generating apparatus, a power accumulating apparatus, a load apparatus, a power network, and a power router and dispersed so that they can be autonomous, via the power routers and power transmission lines, controlled so that sum of inflow power and outflow power in the power router will be zero, and asynchronously interchanging power among the grids, wherein the power network system further comprises a controller connected to each of the power routers via a communication network, and the controller comprises:

an electric energy obtaining unit which obtains a reception electric energy and a transmission electric energy in each of the power routers;

a failure determining unit which determines a failure in a power router or a power transmission line on the basis of the obtained electric energies;

an alternate route searching unit which searches for an alternate route by a breadth first search so as to solve deficient/excessive power caused by occurrence of a failure; and a control instruction output unit which designates a connection source, a transmission electric energy, a connection destination, and a reception electric energy of the alternate route, and outputs a control instruction to power routers of the connection source and the connection destination, wherein the alternate route searching unit selects a root node from power routers having excessive power, searches for a power router having deficient power, and sets an alternate route, and wherein the control instruction output unit outputs a control instruction related to power interchange each time an alternate route is searched.

2. The power network system according to claim 1, wherein the alternate route searching unit selects a power router having largest excessive power as a root node.

3. A control method for a power network system in which a plurality of grids each including a power generating apparatus, a power accumulating apparatus, a load apparatus, a power network, and a power router and dispersed so that they can be autonomous are connected via power routers and power transmission lines, which is controlled so that sum of inflow power and outflow power in the power router will be zero, and which asynchronously interchanges power among the grids, wherein the power network system further comprises a controller connected to each of the power routers via a communication network, and the controller obtains a reception electric energy and a transmission electric energy in each of the power routers;

determines a failure in a power router or a power transmission line on the basis of the obtained electric energies;

searches for an alternate route by a breadth first search so as to solve deficient/excessive power caused by occurrence of a failure; and designates a connection source, a transmission electric energy, a connection destination, and a reception electric energy of the alternate route, and outputs a control instruction to power routers of the connection source and the connection destination, wherein the alternate route search is an alternate search which selects a root node from power routers having excessive power and searches for a power router having deficient power, and wherein the outputted control instruction is a control instruction related to power interchange each time an alternate route is searched.

4. The control method for a power network system according to claim 3, wherein the alternate route search is an alternate route search which selects a power router having largest excessive power as a root node.

5. A non-transitory computer readable information recording medium storing a control program for controlling a power network system formed by connecting a plurality of grids each including a power generating apparatus, a power accumulating apparatus, a load apparatus, a power network, and a power router and dispersed so that they can be autonomous via the power routers and power transmission lines, controlled so that sum of inflow power and outflow power in the power router will be zero, and asynchronously interchanging power among the grids, wherein the power network system further comprises a controller connected to each of the power routers via a communication network, and makes the controller execute:

an electric energy obtaining process for obtaining a reception electric energy and a transmission electric energy in each of the power routers;

a failure determining process for determining a failure in a power router or a power transmission line on the basis of the obtained electric energies;

an alternate route searching process for searching for an alternate route by a breadth first search so as to solve deficient/excessive power caused by occurrence of a failure; and a control instruction output process for designating a connection source, a transmission electric energy, a connection destination, and a reception electric energy of the alternate route, and outputting a control instruction to power routers of the connection source and the connection destination, wherein the alternate route searching process is an alternate route searching process of selecting a root node from power routers having excessive power and searching for a power router having deficient power, and wherein the control instruction output process is a process of outputting a control instructions related to power interchange each time an alternate route is searched.

6. The non-transitory computer readable information recording medium according to claim 5, wherein the alternate route searching process is an alternate route searching process of selecting a power router having largest excessive power as a root node.

\* \* \* \* \*